United States Patent
Macalello et al.

[11] Patent Number: 5,709,239
[45] Date of Patent: Jan. 20, 1998

[54] AUTOMATIC SHUT-OFF SAFETY DEVICE

[76] Inventors: Frank Macalello; Christine Macalello, both of 26061 Red Corral; Ed Sapigao, 24985 Sutter Dr., all of Laguna Hills, Calif. 92653

[21] Appl. No.: 563,190

[22] Filed: Nov. 27, 1995

Related U.S. Application Data

[63] Continuation-in-part of Ser. No. 334,405, Nov. 4, 1994, abandoned.

[51] Int. Cl.$^6$ .................................................. F16K 17/22
[52] U.S. Cl. ............................ 137/465; 137/10; 137/498
[58] Field of Search ............................ 137/460, 464, 137/465, 498, 10; 251/24

[56] References Cited

U.S. PATENT DOCUMENTS

| | | | |
|---|---|---|---|
| 406,847 | 7/1889 | Miller | 137/465 X |
| 825,718 | 7/1906 | Grimes | 137/465 |
| 1,349,443 | 8/1920 | Stokes | 137/465 |
| 1,464,767 | 8/1923 | Kerns | 137/465 |
| 1,514,839 | 11/1924 | Edwards et al. | 137/460 |
| 2,148,410 | 2/1939 | Wait | 137/498 |
| 2,160,766 | 5/1939 | Thomason | 137/460 |
| 2,809,657 | 10/1957 | Stephenson | 137/464 |
| 2,962,044 | 11/1960 | Charboneau | 137/464 X |
| 4,880,030 | 11/1989 | Terry | 137/460 |
| 5,217,043 | 6/1993 | Novakovi | 137/460 |
| 5,251,653 | 10/1993 | Tucker et al. | 137/460 |

FOREIGN PATENT DOCUMENTS

| | | | |
|---|---|---|---|
| 514226 | 11/1939 | United Kingdom | 137/465 |

*Primary Examiner*—Stephen M. Hepperle
*Attorney, Agent, or Firm*—Knobbe, Martens, Olson & Bear, LLP

[57] ABSTRACT

A compact, automatic mechanical fluid shut-off device which can detect a sustained leak in a pipe as well as a pipe burst and automatically shuts off fluid flow in the pipe. The device is detachable, easy to install, and easy to retrofit into existing pipes. The device employs a unique combination of bias mechanism and fluid flow channels to achieve an automated method of stopping a fluid flow when there is an abnormal fluid flow in the pipe due to pipe burst or sustained leak.

39 Claims, 9 Drawing Sheets

AUTOMATIC SHUT-OFF SAFETY DEVICE

RELATED APPLICATION

The present application is a continuation-in-part of application Ser. No. 08/334,405, filed on Nov. 4, 1994 now abandoned.

BACKGROUND OF THE INVENTION

1. Field of the Invention

The present invention generally relates to a fluid safety device, and more particularly to a compact, automatic shut-off safety device.

2. Description of the Related Art

A sustained water leak can cause significant damage to a building and the property inside the building, and result in substantial monetary loss. The problem plagues homeowners and businesses alike, and often arises when a pipe bursts or leaks as a result of, e.g., rust, faulty installation, and defective joints or connectors. A water leak often occurs in hidden areas or when no one is around to shut off the water supply or plug the leak. Sustained leak, whether the rate of leakage is high or low, can cause substantial and even catastrophic property damages, and can sometimes lead to human injuries. This problem drives up insurance cost for residential, commercial, and industrial buildings, and drains considerable human and economic resources on a regular basis.

Even when a leak is discovered, the water main or shut-off valve often cannot be accessed easily and quickly to stop the water supply in time. Therefore, a need exists for a safety device that can detect a pipe burst or sustained leak and automatically shut off the water supply to the plumbing system.

Prior attempts to solve this problem have proved unsatisfactory. For example, U.S. Pat. No. 5,251,653 discloses a control system for automatic fluid shut-off which requires electronics and complex circuitry. The control system disclosed in the '653 patent is difficult to install and requires electrical connections that may often be unavailable or hard to access. For instance, an electrical line must be run to the water main in order to install the control system near the water main stub-out. Such a system is impractical for an average homeowner.

U.S. Pat. Nos. 2,160,766, 2,148,410, and 1,514,839 all disclose mechanical systems that respond to a sudden pressure drop caused by a pipe burst by moving a gate valve to completely block the fluid flow path in the pipe. These systems are complicated and bulky, and have many components and moving parts. As a result, they are difficult to install and are themselves vulnerable to leakage and malfunction. Moreover, none of these systems appears to be able to detect sustained leakage at a relatively low rate and respond thereto.

The device in U.S. Pat. No. 4,880,030 has the advantage of being relatively compact compared to the above-mentioned systems. However, it appears that the piston valve employed in '030 may undesirably close the fluid flow path under normal fluctuations in water pressure upstream, since the piston moves in the direction of the flow path and must be sufficiently sensitive to pressure changes to work effectively. On the other hand, if the piston is made less sensitive to avoid shut off under normal pressure fluctuations (namely, by increasing the size or number of the apertures, or the resistance of the biasing spring), the system will not be able to detect sustained leak at relatively low rates.

SUMMARY OF THE INVENTION

In view of the deficiencies associated with prior fluid shut-off devices, there remains a need for a compact, inexpensive, and simply structured safety valve that is easy to install or to retrofit into existing pipes, can detect a sustained slow leak as well as a pipe burst, and can automatically shut off the fluid flow.

In accordance with an aspect of the present invention, an automatic shut-off safety device comprises a conduit including an influent port and an effluent port adapted to be installed within the fluid delivery system; a valve positioned between the influent and effluent port of the conduit and arranged to selectively block fluid flow through the conduit; a housing comprising a control chamber in which a movable partition is enclosed; a first biasing member disposed inside the first compartment and coupled between the valve and the movable partition; and a second biasing member disposed inside the second compartment and coupled between the movable partition and the housing. The movable partition divides the control chamber into at least first compartment and second compartments separated by the movable partition. The first compartment is in fluid communication with the conduit through an inlet opening upstream of the valve and through an outlet opening downstream of the valve. The inlet opening has a larger effective cross-sectional flow area than that of the outlet opening.

Another aspect of the present invention involves a shut-off control device which comprises a valve movable between a CLOSE position to stop the flow of fluid through the device and an OPEN position to facilitate fluid flow through the device; a housing defining a flow conduit through the housing, the housing at least partially supporting the valve; a movable partition disposed inside the housing and defining a reservoir inside the housing; an entry port formed within the housing to facilitate fluid flow between the reservoir and a flow path within the conduit upstream of the valve; an exit port formed within the housing to facilitate fluid flow between the reservoir and the flow path within the conduit downstream of the valve, the exit port being smaller in size than the entry port; a bias member connecting the movable partition and the valve; and a reset mechanism which releasably holds the valve in the OPEN position until a break or leak occurs downstream of the control device and which releasably holds the valve in the CLOSE position until externally activated.

An additional aspect of the present invention involves a safety flow control device for a water pipe which comprises a housing attached to the pipe and communicating with the water in the pipe to allow water inflow from the pipe upstream of the device and outflow to the pipe downstream of the device; a bias mechanism enclosed in the housing; and a valve at least partially enclosed by the housing. The water flow within the housing has a fluid pressure due to accumulation of water in the housing. The valve is responsive to the fluid pressure in the housing and the bias mechanism, such that the valve is disposed outside of the water flow path in the housing to facilitate the flow during normal operations as the water and fluid pressure accumulate in the housing, and moves into the water flow path and cuts off the water flow path when an abnormal fluid flow occurs downstream of the device.

In accordance with a further aspect of the present invention, an automatic safety device comprises a flexible partition which deforms and stores potential energy when it is deformed, and releases the potential energy when the deformation is removed; a valve coupled to the flexible partition and movable between an OPEN position and a CLOSE position; and a housing having a wall structure which encloses the flexible partition and at least partially encloses the valve. The flexible partition is partially fixed to the housing and divides the housing into a first chamber and a second chamber. The wall structure has an inlet passage for fluid communication between the first chamber and the flow path upstream of the valve and an outlet passage for fluid communication between the first chamber and the flow path downstream of the valve. The inlet passage is greater in size than the outlet passage and has a check valve which permits fluid flow into the first chamber, but prevents fluid flow in the opposite direction.

An additional aspect of the present invention involves an automatic flow safety device which comprises obstructing means for blocking a fluid flow through the safety device; accumulating means for storing potential energy which may be released to activate the obstructing means, the accumulating means being coupled with the obstructing means; and mechanical control means for sensing an abnormal fluid flow downstream of the device resulting in a pressure drop, and communicating the pressure drop to the accumulating means, whereby the accumulating means releases the potential energy to activate the obstructing means to block the fluid flow with the mechanical control means upon sensing an abnormal fluid flow.

Another aspect of the present invention involves a method for automatically stopping fluid flow in a flow path when the fluid pressure in the flow path drops abnormally due to a break or leak, comprising the steps of providing a valve capable of stopping the fluid flow in a flow path, the valve normally lying in an OPEN position such that it does not obstruct the flow path; providing a biasing force to bias the valve to a CLOSE position in which the valve obstructs the fluid flow; communicating mechanically the fluid pressure in the flow path to a pressure transducer to produce a pressure acting on the valve to oppose the biasing force so as to normally maintain the valve in the OPEN position; reducing the pressure force until the biasing force overcomes the pressure force so as to move the valve to the CLOSE position upon an abnormal drop in pressure in the flow path; and releasably locking the valve in the CLOSE position.

BRIEF DESCRIPTION OF THE DRAWINGS

These and other features of the invention will now be described with reference to the drawings of preferred embodiments which are intended to illustrate and not to limit the invention, and in which.

DETAILED DESCRIPTION OF THE PREFERRED EMBODIMENTS

Figure 1A:
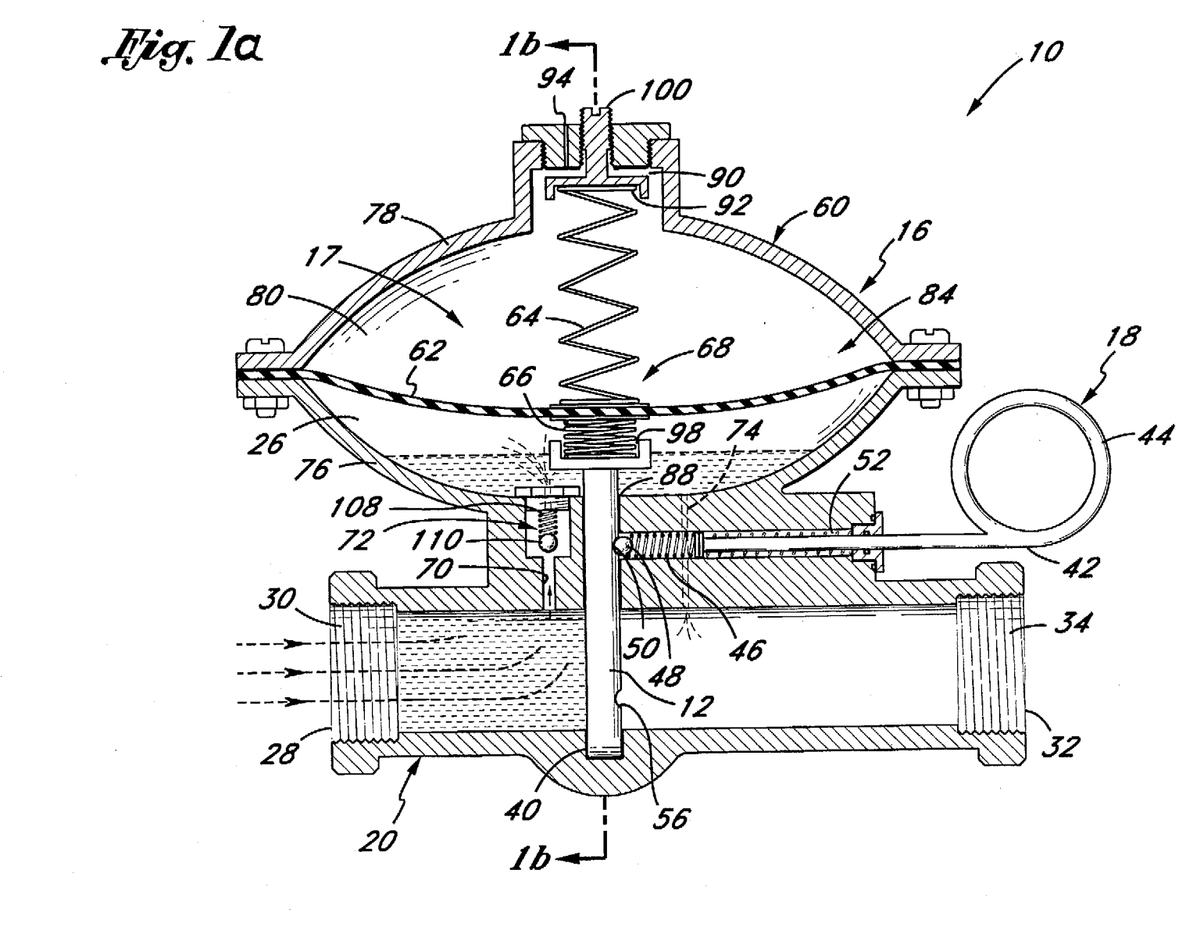
FIG. 1a is a side cross-sectional view of a compact, automatic shut-off safety device configured in accordance with a preferred embodiment of the present invention, wherein the device is at the "fluid introduction" stage.
Figure 1B:
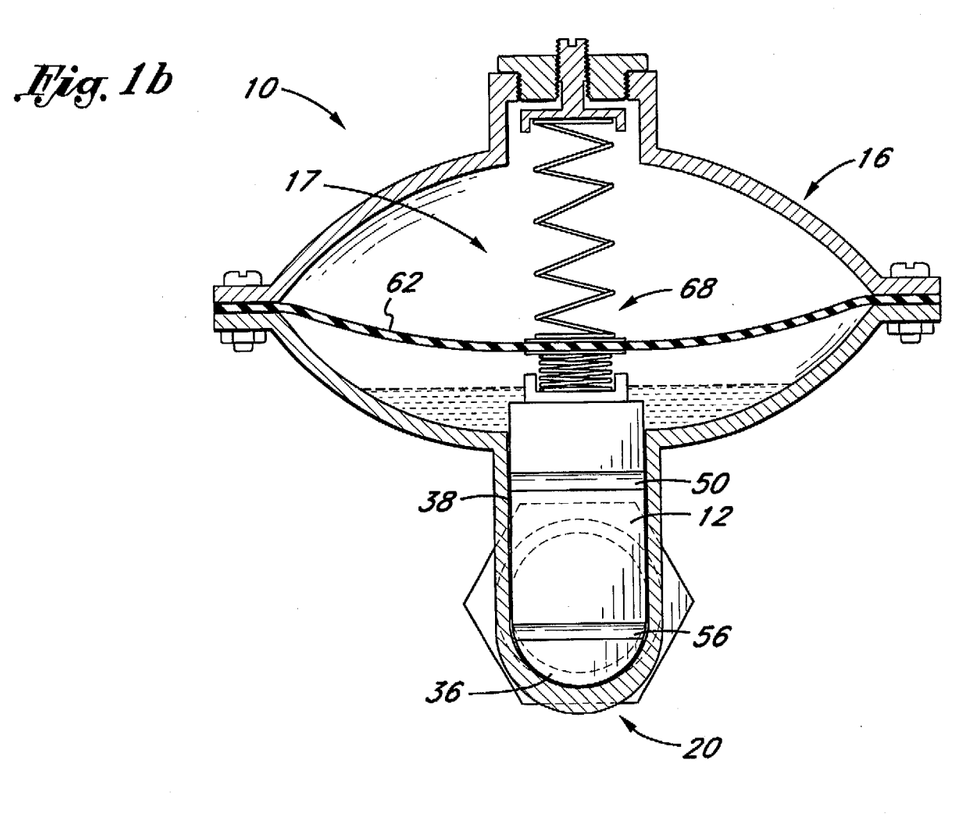
FIG. 1b is a front cross-sectional view of the safety device of FIG. 1a taken along line 1b–1b.

FIG. 1 illustrates an automatic shut-off safety device 10 configured in accordance with a preferred embodiment of the present invention. The safety device 10 is connect to a fluid flow path. The device activates a valve 12 and causes it to move to a CLOSE position when there is an abnormal fluid flow through the device caused by a sustained loss of pressure downstream of the safety device 10 as a result of break or leakage. After the leak or break is repaired, the safety device is reset to return the valve to an OPEN position and allow the fluid to flow unobstructed.

The present automatic shut-off safety device 10 is particularly well suited for use in a water pipe for residential, commercial, or industrial use. For instance, the safety device 10 can be installed in the principal water line for a house that runs off the main line. The safety device 10 desirably is positioned in the principal residential water line at a point downstream of any garden and fire sprinkler lines. It is contemplated, however, that the present safety device can be used with other types of fluid flow implements such as, for example, laboratory apparatus and machines that require fluid flow control with automatic shut-off. The present safety device 10 also is compact and detachable, and easy to install, but it may also be permanently mounted onto a pipe or integrally formed therewith.

Although the figures and the following description illustrate and describe the safety device 10 installed within a horizontal pipe with its control chamber positioned above the pipe, it is understood that others orientations of the present safety device 10 are possible. For instance, those skilled in the art will readily appreciate that the safety device 10 can be installed with its control chamber positioned below the pipe. The safety device 10 also can be designed for installation in a vertical section of pipe by repositioning the influent and effluent orifices extending between the control chamber and the pipe. It therefore is contemplated that those skilled in the art will be able to adapt the general principles of the present safety device 10 to other embodiments in order to suit a variety of specific applications.

Description of the First Embodiment

Figure 3:
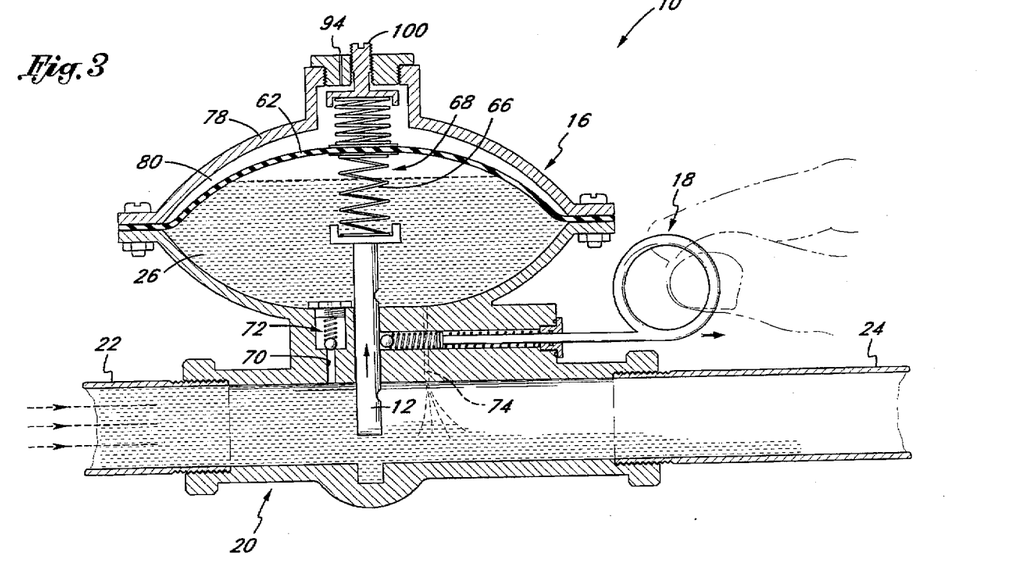
FIG. 3 is a side cross-sectional view of the safety device of FIG. 1, which schematically illustrates the device at the "flow initialization" stage.

As seen in FIGS. 1a and 1b, the safety device 10 principally comprises a gate valve 12 positioned within a fluid flow conduit 20 and operated in part by a reset mechanism 18. A control chamber 16 communicates with the flow conduit 20 and houses an actuator mechanism 17 which, together with the reset mechanism 18, control the gate valve 12. As best seen in FIGS. 1a and 3, the fluid flow conduit 20 is disposed between an inflow pipe 22 and an outflow pipe 24. The individual components of the safety device 10 will now be described in detail.

FIGS. 1a and 1b illustrate the compact safety device 10 with the gate valve 12 closed at its default CLOSE position. Before introducing fluid into a newly installed safety device 10, the gate valve 12 of the device 10 desirably lies in this default CLOSE position. In that position, the valve 12 serves as an obstacle to stop the flow in the conduit completely and hence must cover the entire cross-section of the conduit 20.

The illustrated embodiment employs a gate valve 12 which slides perpendicularly to the axis of the conduit 20, as best understood from FIG. 1b. The gate valve 12 desirably has a 3-dimensional rectangular shape with a rounded portion 36 at one end, which is disposed adjacent to the conduit 20. The sides of the gate valve 12 are desirably straight to facilitate sliding. The rounded end 36 is sufficient to block the conduit 20 because the conduit 20 has a circular cross-section. At the other end of the gate valve 12 is a spring seat 98 which can be either attached to the gate valve 12 or integrally formed therewith. The spring seat 98 provides a cavity or depression on which a member of the actuator mechanism 17 can be mounted as discussed below.

The gate valve 12 has a first groove 50 and a second groove 56 disposed on one side of the valve 12 located between the rounded end 36 and spring seat 98 and spaced apart from one another. The first groove 50 is spaced from the rounded end 38 of the valve 12 such that the groove 50 cooperates with the reset mechanism 18 when the rounded end 38 rests in the valve seat 40 in the CLOSE position. When the valve 12 is in the OPEN position, it has been removed from the fluid path of the conduit 20 and the second groove 56 is spaced from the rounded end 38 to cooperate with the reset mechanism 18.

As illustrated in FIGS. 1a and 3, the fluid flow conduit 20 has an inflow port 28 at one end for attachment to an inflow pipe 22, and an outflow port 32 at the other end for attachment to an outflow pipe 24. The conduit 20 desirably has a circular cylindrical wall structure with an internal diameter that desirably matches the internal diameters of the inflow and outflow pipes 22 and 24. It will be appreciated, however, that the conduit 20 can be of any shape and dimension to accommodate the orientation, size and shape of the inflow and outflow pipes 22 and 24. In this embodiment, the conduit 20 is cylindrical and the cross section is circular for straight connection between the circular pipes 22 and 24.

The inflow port 28 desirably has a threaded portion 30 to facilitate attachment with the inflow pipe 22 such that the inflow pipe 22 can be detachably connected at its threaded end to the inflow port 28. The outflow port 32 desirably also has a threaded portion 34 for detachable connection with the outflow pipe 24 that has a matching threaded end.

As shown in FIG. 1a, the conduit 20 has a valve passageway or guide 38 which intersects the conduit 20 through the conduit wall and is oriented substantially perpendicular to the flow in the conduit 20. The valve guide 38 is desirably a straight passageway of a size slightly larger than the cross section of the valve 12 to provide a sliding fit for the valve 12. The conduit 20 preferably has a valve seat 40 for supporting and securing the gate valve 12 as it stays in the CLOSE position. The valve seat 40 has an internal cavity which is shaped to cooperate with the end 36 of the valve 12 and is disposed at the inner wall of the conduit 20 opposite the valve guide 38. The valve seat 40 is aligned with the valve guide 38 so that the valve seat 40 is along the path through which the valve 12 moves. Both the valve guide 38 and valve seat 40 are preferably integrally formed with the conduit 20.

Although the valve of the present embodiment is described in terms of a gate valve, it will be apparent to one skilled in the art that other types of valves can also be used in place of the gate valve 12, such as, e.g., a butterfly valve or an inflatable/deflatable member. While the mechanics of operating the safety device 10 with these other valves will be slightly altered, the basic principle is the same and the safety device 10 lends itself to other types of valves.

The reset mechanism 18 comprises a reset member 46 which is coupled with a detent member 48 at one end. A release pin 42 is preferably connected to the other end of the reset member 46. The release pin 42 desirably has a ring 44 at its free end which is large enough for human fingers to manipulate. If the location of the safety device 1Q is not convenient for easy access, a cable or similar mechanism (not shown) can be used to connect the release pin 42 to a remote, convenient location for activating the reset mechanism 18.

The reset member 46 is desirably a spring which is compressed by a retaining member 52, desirably a retaining spring, which is provided to contact in series with the reset spring 46 at one end. The other end of the retaining spring 52 is fixed to the control chamber 16. The detent member 48 is sized to cooperate with the first groove 50 and second groove 56 of the gate valve 12 and desirably has the shape of a round bar or round ball. A variety of reset mechanisms 18 will be readily apparent to one skilled in the art, but the spring mechanism in the preferred embodiment is structurally simple and operates effectively.

As best shown in FIGS. 1a and 1b, the control chamber 16 comprises a housing 60 defining an enclosure 84 in which the actuator mechanism 17 is disposed. The actuator mechanism 17 includes a movable partition 62, a compression bias spring, 64 and a tension bias spring 66. The movable partition 62 defines two separate compartments inside the housing 60, a first compartment 26 and a second compartment 80. The compression bias spring 64 disposed in the second compartment 80 connects one side of the movable partition 62 to the housing 60. The tension bias spring 66 connects the other side of the movable partition 62 to the spring seat 98 of the gate valve 12 in the first compartment 26. FIGS. 1a and 1b illustrate the default positions of the springs 64 and 66, movable partition 62, and gate valve 12 at fluid introduction. The device 10 has the same default positions before installation.

The movable partition 62 is desirably shaped as a circular disk. The first compartment 26 is defined by the movable partition 62 and a first housing wall structure 76 generally shaped as a dome. The first housing wall 76 is desirably integrally formed with the conduit 20. The gate valve 12 is desirably partially disposed inside the first compartment 26. A second housing wall structure 78 is also generally dome-shaped and, together with the movable partition 62, define the second compartment 80. The first and second walls 76 and 78 preferably are separately formed and fastened around the edges to form the enclosure 84 that comprises the first and second compartments 26 and 80.

In the preferred embodiment, the movable partition 62 is a flexible diaphragm which is fixed along its circumferential edge, being sandwiched between the edges of the first and second walls 76 and 78 and fastened together therewith. The movable partition 62 moves within the enclosure 84 and causes the volume of the first compartment 26 to increase while contracting the second compartment 80 and vice versa. The housing walls 76 and 78 are rigid such that the total volume of the first and second compartments 26 and 80 are fixed. The expansion and contraction of the compartments 26 and 80 require that the flexible diaphragm 62 be both strong and flexible. The flexible diaphragm 62 can be made of metal or plastic or other suitable material with sufficient flexibility and strength.

The first compartment 26 communicates with the conduit 20 via an inlet port 70 and an outlet port 74. The inlet port is located at the upstream side of the gate valve 12 and is equipped with a check valve 72. The outlet port 74 is disposed at the downstream side of the gate valve 12 and is desirably smaller than the inlet port 70. The outlet port 74 is more preferably substantially smaller in size than the inlet port 70 and is most preferably a capillary with a small orifice that restricts the flow through the outlet port 74 to relatively small flow rates. The check valve 72 at the inlet 70 permits fluid to flow only in one direction from the conduit 20 to the first compartment 26. The check valve 72 desirably comprises a compressed check valve spring 108 fixed to the first housing wall 76 and a check ball 110 coupled to the spring 108. The check valve 72 is oriented with the check ball 110 adjacent the inlet opening 70 so that the check ball 110 may block the opening 70 as required by the operation to prevent flow from the conduit 20 to the first compartment 26.

Aside from the inlet and outlet openings 70 and 74 at the first wall 76 to allow fluid communication between the first compartment 26 and the conduit 20, the first wall 76 has an opening 88 that leads to the valve passageway 38 for guiding the gate valve 12. The location of the valve passageway opening 88 is preferably at or near the apex of the dome-shaped first wall 76.

At the second wall 78 is preferably disposed a protrusion which defines an internal cavity 90 that forms part of the enclosure 84. The cavity 90 desirably has the shape of a circular cylinder. At this internal cavity 90 is disposed a spring seat 92 for one end of the compression bias spring 84, which is connected to the movable partition 62 at the other end. The seat 92 provides a cavity or depression on which the spring 84 is mounted. The internal cavity 90 and the seat 92 are preferably located at the apex of the dome-shaped second wall 78 and the compression bias spring 64 preferably is connected to the center of the movable partition 62. An air exit passage 94 is preferably provided at the cavity 90 of the second wall. The size of the exit passage 94 is desirably small to prevent entry of foreign particles into the second compartment 80.

The compression bias spring 64 and tension bias spring 66 form a bias mechanism 68 that in part controls the movement of the valve 12. The spring constants or resistance parameters of the springs 64 and 66 to be used preferably are determined by the range of normal operative fluid pressure in the conduit 20. That is, for a given set of inlet and outlet openings 70 and 74, the higher the normal operating fluid pressure, the more resistant the springs 64 and 66 should be to facilitate optimal and consistent operation of the device 10 without malfunction.

The compression bias spring 64 and tension bias spring 66 desirably are coil springs and positioned and oriented along a centerline that coincides with the centerline of the gate valve 12 as illustrated in FIGS. 1a and 1b. The compression bias spring 64 is preferably adjustable via an adjustment screw 100 that changes the spring constant and, hence, resistance of the compression bias spring 64. The adjustment screw 100 is connected to the end of the bias spring 64 through the spring seat 92. In the preferred embodiment, the adjustment screw 100 extends partially outside the housing 60 to allow external manipulation.

The safety device 10 can be made of a variety of materials by a number of methods. The choice of material and manufacturing process depends largely on the application, which dictates, e.g., the strength and size of the housing 60 and conduit 20. In general, some components can be cast from iron or aluminum; others can be made of steel. Some or all of the components can be made of plastics, such as PVC or PTFE. For plastics, injection molding or other suitable manufacturing methods can be used, and components can be bonded by an adhesive compound. The step-by-step operation of the safety device will now be described.

Operation of the First Embodiment

FIGS. 1–7 show the cross-sectional views of the device 10 to illustrate the operation during a pipe burst or leak, which is briefly summarized as follows: The gate valve 12 opens and closes according to the combined effects of the actuator mechanism 17 within the control chamber 16 and the reset mechanism 18. Before fluid is introduced into the safety device 10, the gate valve 12 rests in the default CLOSE position and is held in place by the reset mechanism 18. When the safety device 10 is connected to the inflow pipe 22 and fluid is introduced therein, the fluid pressure builds up in the first compartment 26 of the control chamber 16. The reset mechanism 18 is then manually activated to release the gate valve 12, allowing the gate valve 12 to move to an OPEN position and the fluid to flow through. The reset mechanism 18 holds the gate valve 12 in that OPEN position until there is a leak or burst and, as a result, the fluid level in the first compartment 26 of the control chamber 16 drops below a critical level. The gate valve 12 then automatically returns to the CLOSE position, overcoming the restraint created by the reset mechanism 18. The reset mechanism 18 again holds the gate valve 12 in the CLOSE position until the leak or break is repaired and fluid pressure in the first compartment 26 of the control chamber 16 restored, at which point the reset mechanism 18 can once again be activated to re-initialize normal flow.

FIGS. 1a and 1b illustrate the "fluid introduction" stage where the device 10 has just been installed and fluid introduced into the conduit 20. The bias mechanism 68 biases the movable partition 62 toward the first housing wall 76 such that the volume of the first compartment 26 is at its pre-installation lowest level. The first and second compartments 26 and 80 are desirably initially filled with ambient air. Prior to installation, the gate valve 12 is closed and the compression bias spring 64 and tension bias spring 66 are relaxed or in slight compression. The precise slide fit between the gate valve 12 and the walls that form the valve guide 38 prevent any transfer of fluid therethrough. The check valve spring 108 pushes the check ball 110 to close the inlet port 70.

As the conduit 20 is connected to the inflow pipe 22 and outflow pipe 24, fluid is introduced through the inflow port 28 into the conduit 20 while the gate valve 12 remains closed. Because the conduit 20 is blocked by the gate valve 12, the fluid pushes the check valve 72 open and enters the first compartment 26 through the inlet port 70. The fluid builds up pressure in the first compartment 26 and pushes the movable partition 62 toward the second housing wall 78. The pressure force overcomes the spring forces provided by the bias mechanism 68. As a result, the compression bias spring 64 is compressed and the tension bias spring 66 is stretched. The first compartment 26 expands and the second compartment 80 contracts as the air in the first compartment 26 is compressed by the fluid and the air in the second compartment 80 escapes through the air passage 94. The fluid fills the first compartment 26 relatively quickly because the inlet port 70 is large compared to the outlet port 74, and the pressure differential between the first compartment 26 and the conduit 20 is substantial. The outlet port 74 is not blocked, but is small. Hence, the fluid exits the first compartment 26 slowly through the outlet port 74, and the flow rate into the first compartment 26 through the inlet port 70 is higher than the flow rate out through the outlet port 74.

Figure 2:
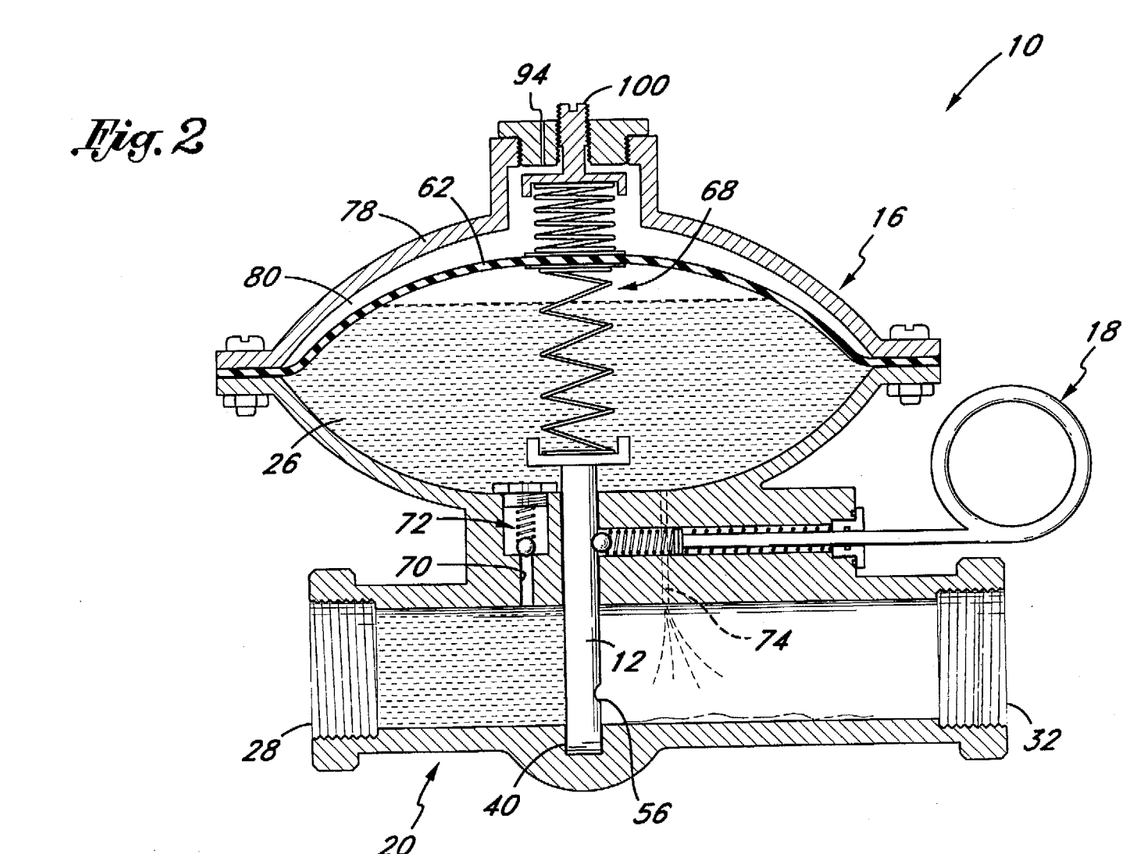
FIG. 2 is a side cross-sectional view of the safety device of FIG. 1, wherein the device is in the "fluid accumulation" stage.

After the fluid fills a substantial portion of the first compartment 26 and the movable partition 62 is pushed considerably toward the second housing wall 78, the pressure inside the first compartment 26 reaches substantially the fluid pressure in the inflow pipe 22. FIG. 2 illustrates this "fluid accumulation" stage of the device 10. The check valve 72 is now closed because the fluid pressure upstream is no longer high enough to overcome the force of the compressed check valve spring 108. Potential energy is stored in the compression bias spring 64 because it is compressed, and in the tension bias spring 66 because it is stretched. The movable partition 62 can also accumulate potential energy if it is stretched due to its flexibility or otherwise moved to a higher potential plane. The detent ball 48 remains lodged in the first groove 50 of the gate valve 12.

When the safety device 10 is at the stage shown in FIG. 2, the device 10 is ready to be initialized by opening the gate valve 12. The air passage 94 is small and hence not likely to provide a view into the control chamber 16 to observe the status of the device 10. A number of methods can be employed to alert the user that the device 10 is ready to be initialized. One way is to provide a transparent second housing wall 78 to permit observation of the position of the movable partition 62. Another way is to simply wait for a preset time that will generally be more than sufficient for the fluid level and pressure to build up in the first compartment 26.

Figure 4:
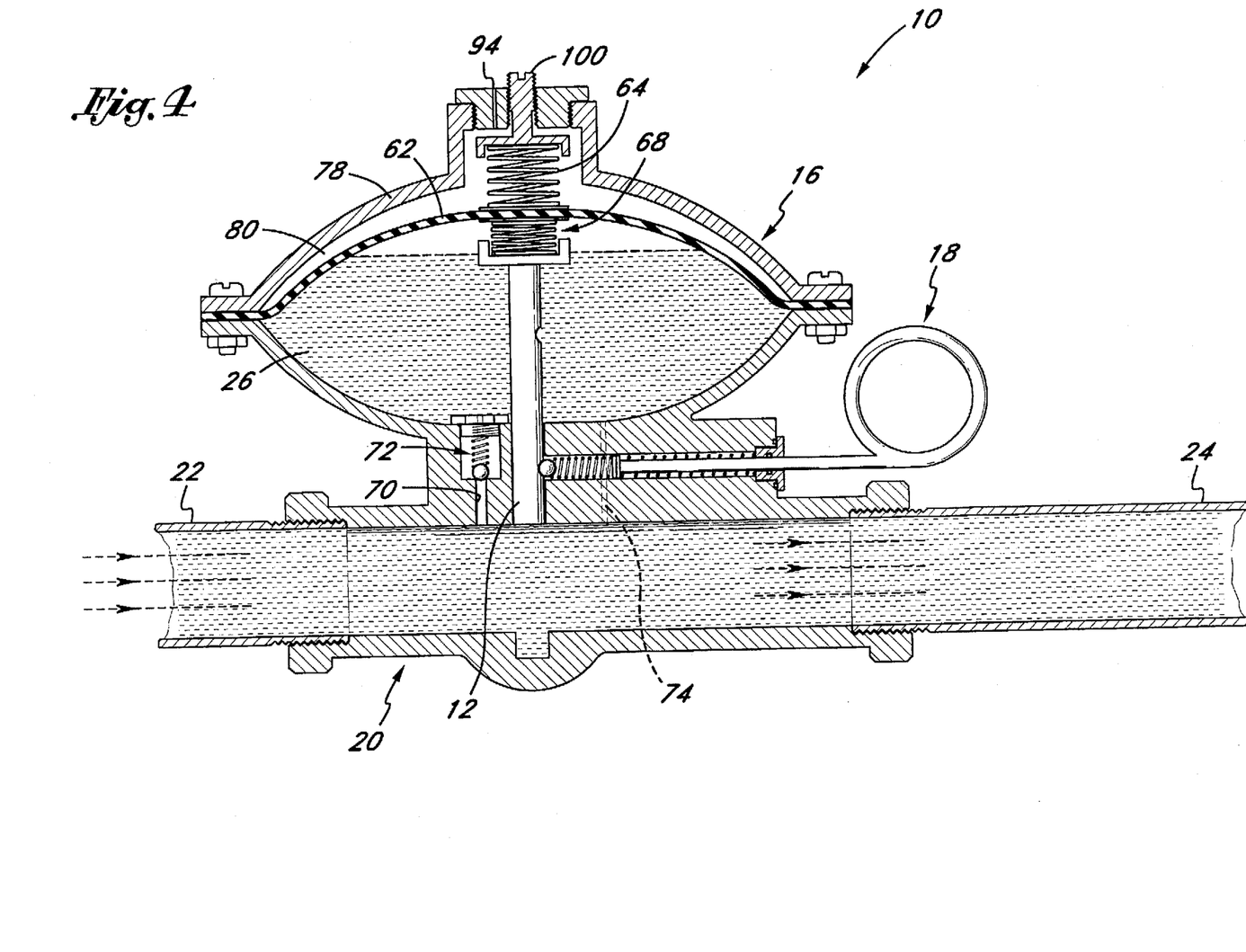
FIG. 4 is a side cross-sectional view of the safety device of FIG. 1 in the "sustained flow" stage.

In the "flow initialization" stage schematically illustrated in FIG. 3, the safety device 10 is initialized by pulling the release pin 42 to relieve the compression on the detent member 48, thereby lessening the hold on the gate valve 12 by the detent member 48 and allowing the detent member 48 to slip out of the first groove 50 of the gate valve 12. This causes a release of the potential energy stored in the tension bias spring 66 which pulls the gate valve 12 to the OPEN position out of the conduit 20. The device 10 is configured so that the gate valve 12 is completely outside the conduit 20, and preferably is flushed with the conduit 20 inner wall, when the tension bias spring 66 returns to its relaxed state as shown in FIG. 4. As the gate valve 12 leaves its valve seat 40 and opens up, the fluid upstream flows through the conduit 20 and the outflow port 32, and into the outflow pipe 24.

FIG. 4 shows the "sustained flow" stage, with the gate valve 12 at the OPEN position and a sustained flow through the conduit 20. The valve 12 is completely opened and the fluid pressure both upstream and downstream of the valve 12 are in substantial equilibrium with the fluid pressure in the first compartment 26 of the control chamber 16. The detent member 48 is lodged in the second groove 56 on the gate valve 12 and there is no fluid flow between the first compartment 26 and the conduit 20 except for a slight flow through the outlet port 74 due to normal fluctuations in fluid pressure in the conduit 20. The compression bias spring 64 continues to store energy from compression and the flexible diaphragm 62 retains it potential energy due to stretching. Except for normal fluid pressure fluctuations, the fluid level in the first compartment 26 of the control chamber 16 remains substantially constant. The fluid pressure in the conduit 20 is in substantial equilibrium with the fluid pressure in the first compartment 26. The flow through the conduit 20 is sustained until it is interrupted by leakage or burst.

Figure 5:
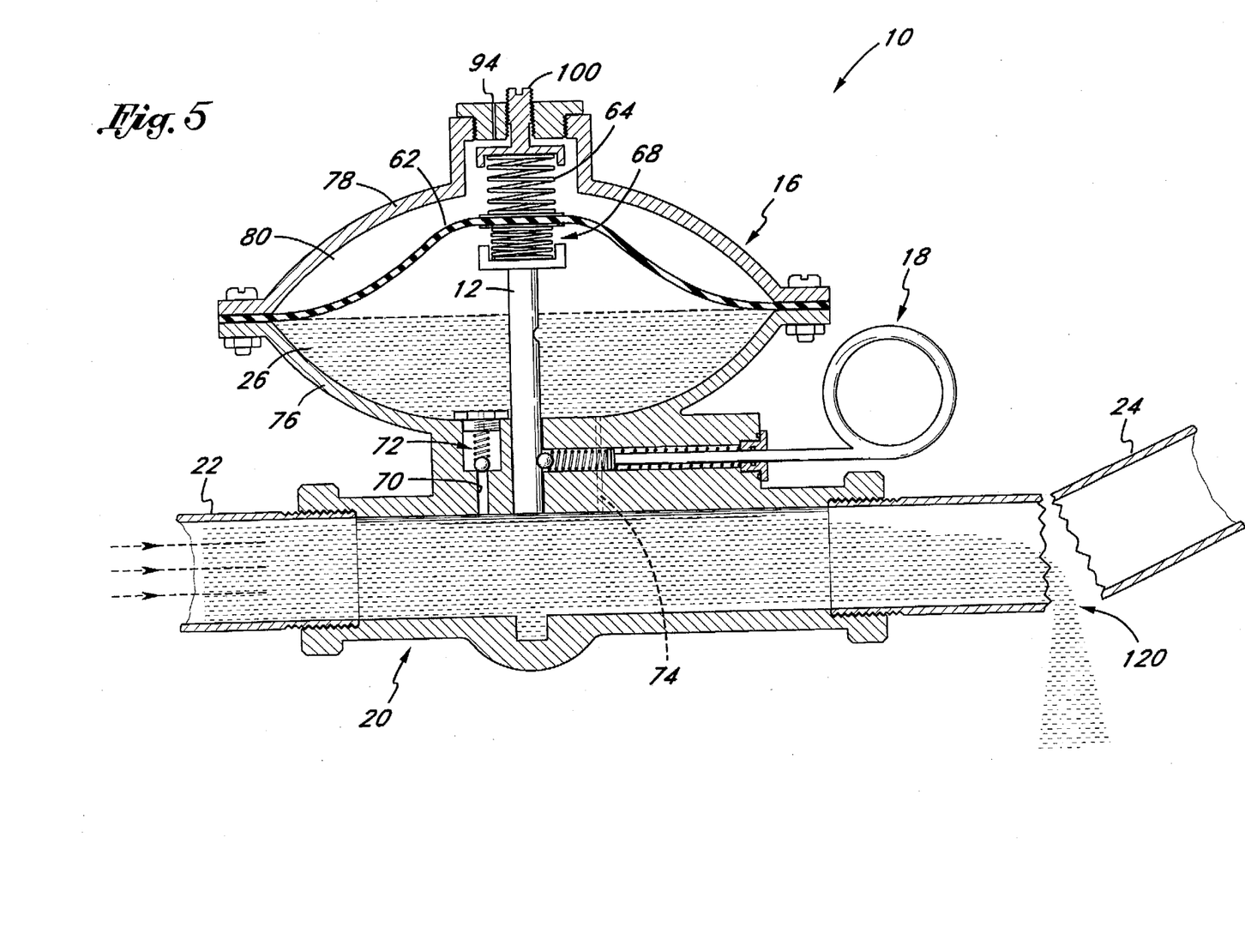
FIG. 5 is a side cross-sectional view of the safety device of FIG. 1, schematically illustrating the "venturi" stage.

FIG. 5 shows what happens when the outflow pipe 24 downstream bursts or leaks and loses pressure in the "venturi" stage. A break 120 in the outflow pipe 24 causes the fluid to leak out. The fluid pressure in the area of the break 120 (downstream) drops below the pressure in the inflow pipe 22 (upstream), creating a venturi effect at the outlet port 74. As a result, the fluid in the first compartment 26 is drawn out through the outlet port 74 via the venturi effect. In FIG. 5, the fluid level in the first compartment 26 has dropped and will continue to drop to a critical level, at which point the force of the compression bias spring 64 and the flexible diaphragm 62 overcomes the reduced pressure force in the first compartment 26 and pushes the movable partition 62 toward the first housing wall 76. This movement causes the tension bias spring 66 to be compressed, generating a force that overcomes the detent force produced by the detent member 48 against the second groove 56 and drives the gate valve 12 closed. This "critical" stage is illustrated in FIG. 6 where the gate valve 12 is on the verge of being dislodged from the detent member 48 and pushed by the compression bias spring 64 and tension bias spring 66 to the CLOSE position.

Figure 6:
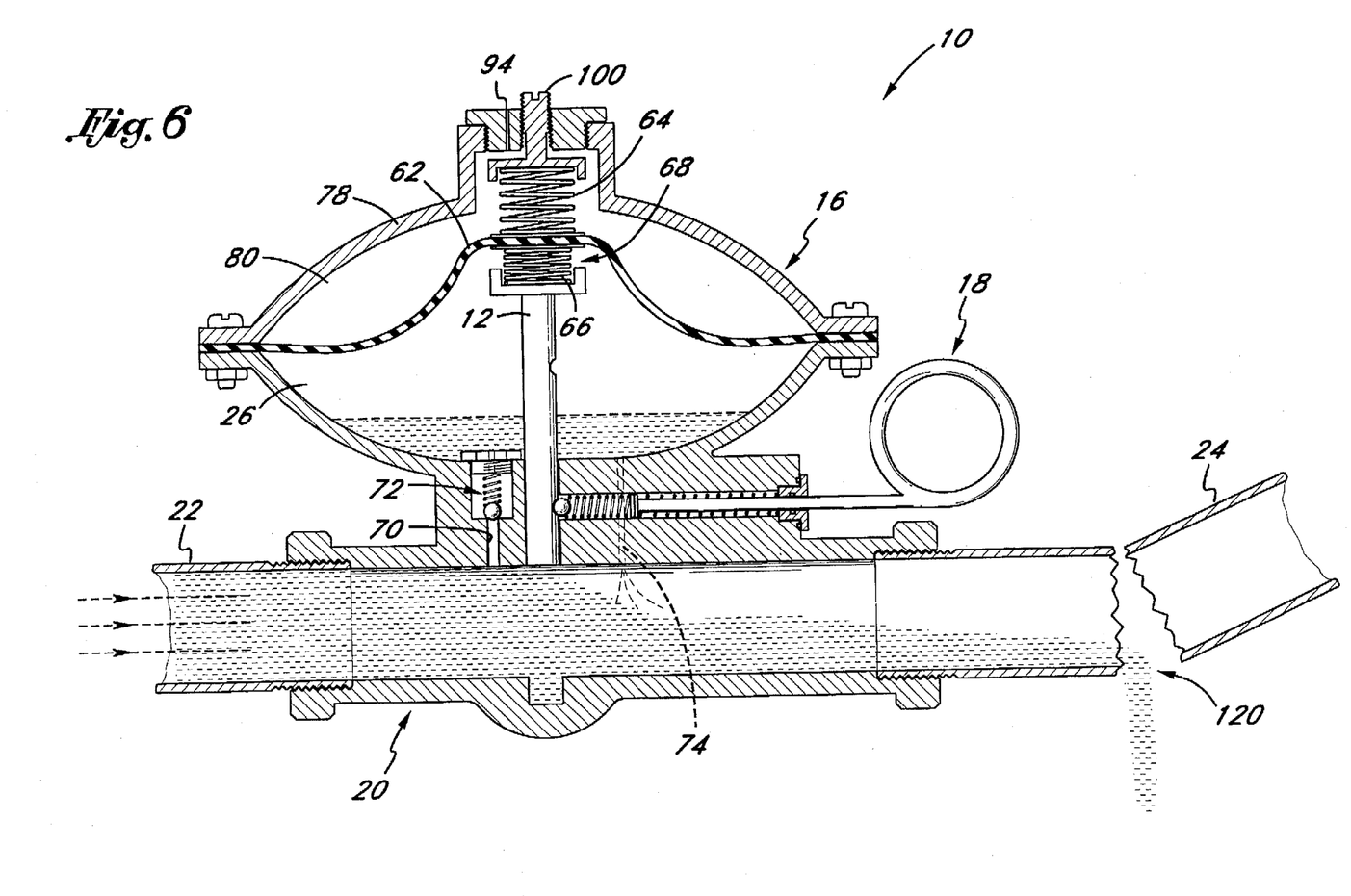
FIG. 6 is a side cross-sectional view of the safety device of FIG. 1, schematically illustrating the "critical" stage.

The drop in fluid level inside the first compartment, as illustrated in FIGS. 4–6, can result from either a pipe burst or leak. When the outflow pipe 24 breaks, the drop in pressure creates a large differential between the pressure upstream in inflow pipe 22 and pressure downstream in outflow pipe 24. The fluid leaks out of the outflow pipe. At the same time, the venturi effect draws fluid out of the first compartment 26 through the outlet port 74 relatively fast and drains the first compartment 26 until the fluid therein drops to the critical level. The check valve 72 remains closed because the pressure in the conduit is decreased while the pressure inside the first compartment 26 remains relatively high because the movable partition 62 maintains that pressure by decreasing the volume of the first compartment 26 as fluid level therein drops. When the drop in pressure in the outflow pipe 24 is due to a sustained slow leak rather than a pipe burst, the pressure differential is not as large but still draws fluid out of the first compartment 26, but at a lower flow rate than for the pipe burst. The bias mechanism 68 and the movable partition 62 function in a similar way as in the case of a pipe burst.

The gate valve 12, however, does not close immediately at the time the leak develops or the pipe bursts. Such a device would be impractical because the device would shut-off fluid flow every time a faucet were fully opened. The control chamber design of the present device 10 rather affords a time delay feature in order to differentiate between normal fluid flow and abnormal fluid flow. The time delay thus avoids unintentional shut-off of the fluid flow through the device 10.

The delay in closing the valve 12 is the time between that moment in which the leak develops or the pipe bursts until the device 10 reaches the critical stage, i.e., the fluid within the first compartment 26 drains to the critical level. By adjusting the delay time, the device 10 can be tailored to sense abnormal water uses and automatically shut the valve 12 to restrict further fluid flow.

In the illustrated embodiment, the time delay is a function of two variables: (1) the force biasing the closure of the gate valve 12; and (2) the rate of pressure decrease in the first compartment 26 which is a function of the flow rate from the first compartment 25. By changing the spring constant or the amount of deflection of the compression spring 64, the biasing force can be changed so as to close the gate valve 12 with more or less of a pressure drop within the first compartment 26. In this manner, the adjustment screw 100 permits the device 10 to be adapted to a range of applications because it allows adjustment of the degree of compression of the compression bias spring 64 after installation of the device 10. Consequently, the device 10 is adaptable to suit the need of the user who may control the time delay.

In addition, the flow rate from the first compartment 26 can be altered by varying the size of the outlet port 74. A larger outlet port 74 would expedite the flow out of the first compartment 26 and reduce the time delay.

The unique disposition of the springs 64 and 66 in the bias mechanism 68 in relation to the movable partition 62 and gate valve 12 in the control chamber 16 therefore makes the device 10 operate efficiently and effectively with the flow arrangement in and out of the first compartment 26. The control chamber 16 acts as a pressure transducer to the valve 12 such that the control chamber 16 mechanically detects the abnormal fluid flow through the device 10 and produces a mechanical force to act on the valve 12.

The function of the second groove 56 is somewhat different from that of the first groove 50. The detent member 48 is lodged in the first groove 50 until the reset mechanism 18 is activated. But the detent member 48 can be dislodged from the second groove 56 automatically. The second groove 56 remains locked with the detent member 48 only where the fluid pressure in the first compartment 26 of the control chamber 16 and the conduit 20 stays relatively normal. When there is a leak or burst, the fluid pressure can drop to a point that the gate valve 12 is pushed toward the CLOSE position and the detent member 48 will slip out of the second groove 56, and the gate valve 12 will automatically return to the CLOSE position. This difference in performance can be achieved by having a deeper first groove 50 for the CLOSE position than the second groove 56 for the OPEN position. Alternatively, if the distance between the release pin 42 and the second groove 56 is longer (as may be achieved by a change in the shape of the gate valve 12), the compression on the detent member 48 against the second groove 56 is lower and, hence, it is easier for the detent member 48 to slip out of the second groove 56.

Figure 7:
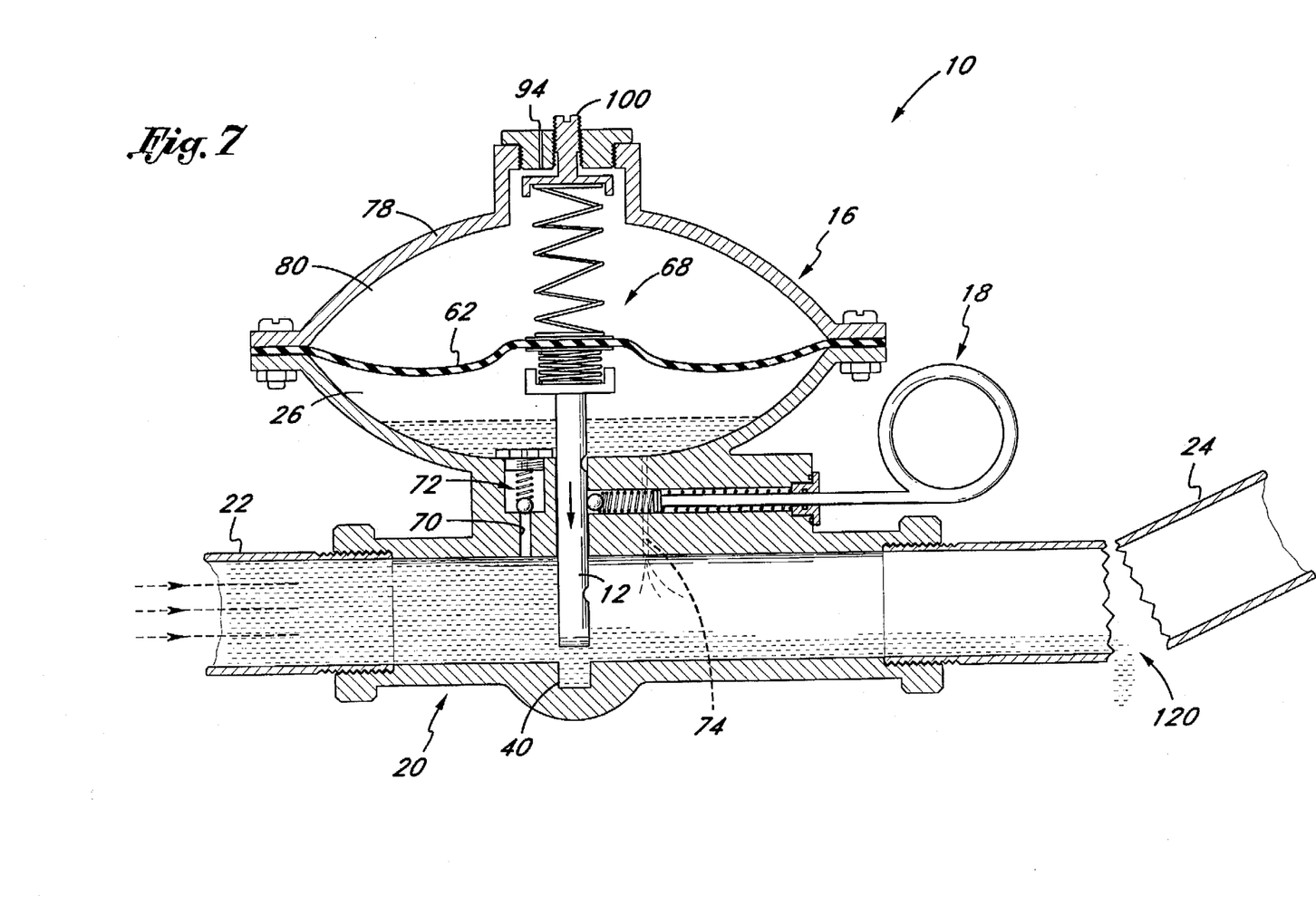
FIG. 7 is a side cross-sectional view of the safety device of FIG. 1, which illustrates schematically the "valve closure" stage.

FIG. 7 illustrates the closing of the gate valve 12 at the "valve closure" stage due to pressure drop from the break or leak 120. As the gate valve 12 retires onto the valve seat 40, the detent member 48 is lodged into the first groove 50 of the gate valve 12 and secures the gate valve 12 shut. The movable partition 62, the compression bias spring 64, and the tension bias spring 66 all return to their default positions as shown in FIG. 1. The reset mechanism 18 keeps the gate valve 12 closed until it is reactivated to open the gate valve 12 as described above and illustrated in FIGS. 1–3.

Second Embodiment and Operation

The safety device 10 can function even without the compression bias spring 64 shown in FIGS. 1a and 1b if the movable partition 62 has sufficient flexibility and energy-storing capability. In the second embodiment illustrated in FIG. 8, a prime is used to denote like components with the first embodiment 10 since the alternative embodiment of the safety device 10' is substantially the same as the first embodiment 10 except that the bias spring 64 is eliminated and the second compartment 80' is now closed with no air exit passage 94 or cavity 90. The movable partition 62' is a flexible diaphragm with sufficient flexibility and strength to store potential energy as it deforms, and releases it and returns to the relaxed position as the forces causing the deformation are removed. This movable partition 62' allows the storage and release of potential energy during operation in much the same way as in the first embodiment 10 but without the need for the bias spring 64. The flexible diaphragm 62' is coupled at its center portion to the gate valve 12', preferably through bias spring 66'. The second compartment 80' is enclosed and contains a compressible fluid or gas.

Figure 8:
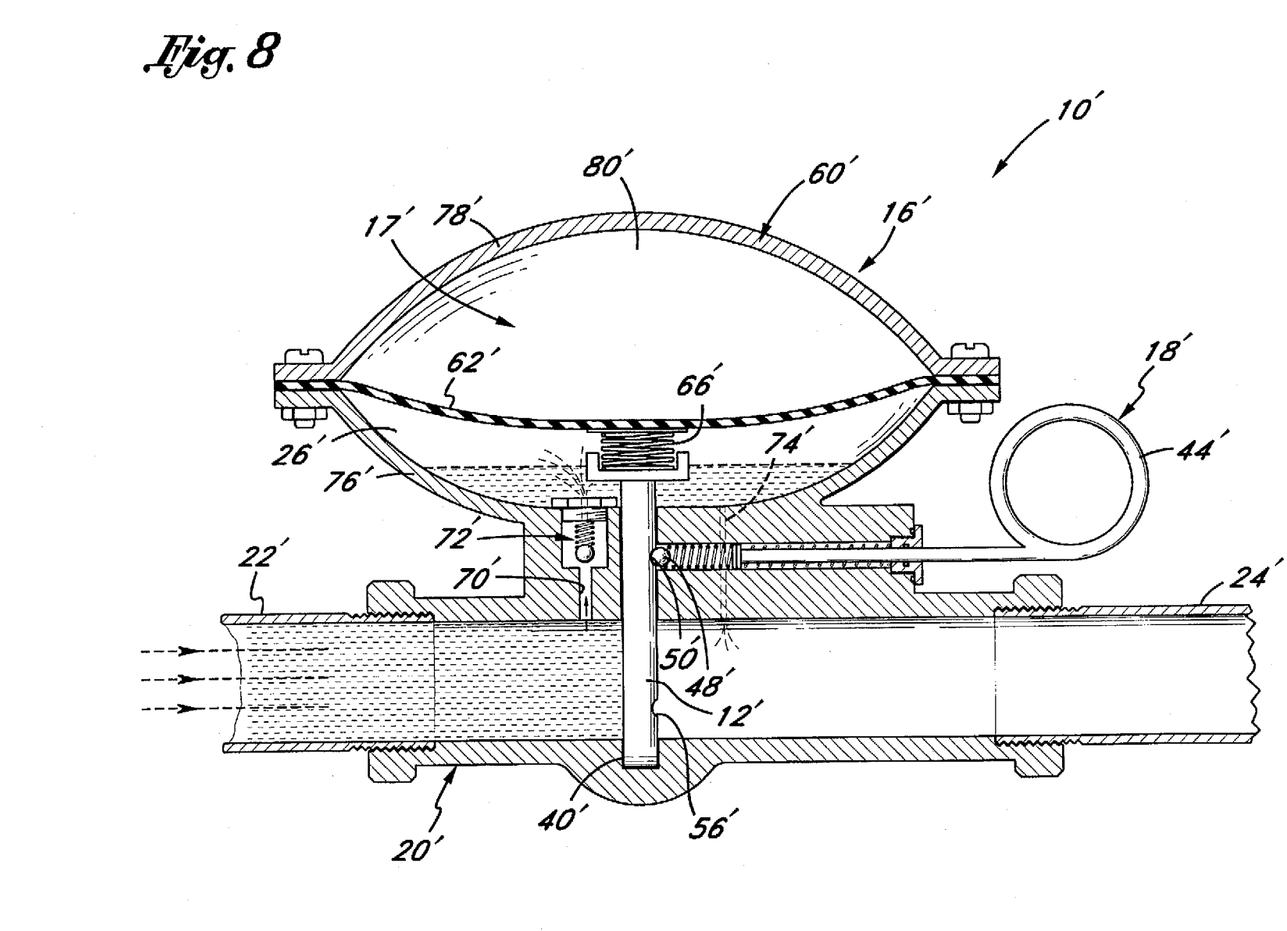
FIG. 8 is a side cross-sectional view of an automatic shut-off safety device configured according with a second embodiment of the present invention.

When the safety device 10' is first installed and fluid is introduced into the device 10', the flexible diaphragm 62' remains coupled to the gate valve 12' at the center portion. The rest of the diaphragm 62', namely, the annular section between the center portion secured to the gate valve 12' and the fixed circumference fixed to the housing 60, deforms under the fluid pressure in the first compartment 26 as it moves from its default relaxed position outward to allow the first compartment 26 to expand. As the fluid fills the first compartment 26' substantially, the annular section of the flexible diaphragm 62' is greatly deformed to allow the first compartment to expand and occupy a large portion of the enclosure 84' of the housing 60' The gas inside the second compartment 80' is compressed and the tension bias spring 66' is stretched. Potential energy is stored in the diaphragm 62', compressible gas, and bias spring 66' due to the deformation, as the gate valve 12' remains closed. This is similar to the storage of potential energy in the bias springs 64 and 66 in the first embodiment 10, provided that the movable partition 62 does not store potential energy.

When the reset mechanism 18' is activated, the gate valve 12' is driven to the OPEN position by the flexible diaphragm 62' and bias spring 66'. The bias spring 66' releases its potential energy as in the first embodiment 10. But the diaphragm 62' releases only some of its potential energy as it moves the valve 12' and deforms into a relatively more relaxed spheroidal shape. The compressible gas inside the second compartment 80' also maintains its potential energy due to compression. Thus, the diaphragm 62' and compressible gas retain some of their potential energy as the compression bias spring 64 does in the first embodiment 10.

Upon an abnormal drop in fluid pressure in the conduit 20 due to a burst or sustained leak, the fluid level in the first compartment 26' decreases. The fluid pressure also drops and causes the diaphragm 62' to deform again in the annular section between the secured center portion and circumference. The deformation in certain parts of the diaphragm 62', namely, the portion close to the fixed circumference, will cause the diaphragm 62' to revert partially to its relaxed position and release some of its potential energy. The deformation in other parts, namely, the area adjacent the secured center portion, will accumulate additional potential energy since it will now undergo further deformation, as analogous in shape to the diaphragm 62 shown in FIG. 5. The compressible gas inside the second compartment 80' releases its energy. This deformation pattern is analogous to that of the bias springs 64 and 66. For the first embodiment 10 at this stage, the compression in the compression bias spring 64 is lessened, thereby releasing potential energy in spring 64, while the tension bias spring 66 undergoes compression and accumulates potential energy thereby. That is, there is accumulation and release of potential energy in the bias mechanisms 68 and 68' in both embodiments 10 and 10' although the mechanics are different.

After the fluid level in the first compartment 26' drops to the critical point, the diaphragm 62' acts on the gate valve 12' through the bias spring 66' and overcomes the detent force produced in the reset mechanism 18' to drive the gate valve 12' back to the CLOSE position. The diaphragm 62' releases all of its potential energy accumulated from the deformation cycle described above as it returns to its default CLOSE position, just as the bias spring 66 releases its potential energy in the first embodiment 10.

Therefore, the operation of the second embodiment 10' is substantially the same as the operation of the first 10. The resistance of the diaphragm 62' will not be easily adjustable as in the case of the first embodiment 10 where the spring constant of the bias spring 64 can be adjusted via the adjustment screw 100. But the second embodiment 10' has a simpler structure because it eliminates the bias spring 64 and associated components. Each embodiment thus has its own unique features and advantages.

Conclusion

The preferred embodiments of the safety device 10 and 10' have fewer moving parts than prior art devices and functions more effectively. It is compact and adaptable to various pipe sizes and configurations. It can be retrofitted into existing pipes. The automatic shut-off works for both pipe burst and sustained leaks. The adjustment screw 100 ensures that the device 10 is adaptable to a range of normal flow pressures. The device 10 can also be combined with a flow meter and internally formed therewith to achieve a multi-purpose device (not shown). The flow sensor will be disposed inside the conduit and the meter will be located externally for convenient display.

The many advantages and unique features of the present invention have been described above. Although this invention has been described in terms of certain preferred embodiments, other embodiments that are apparent to those of ordinary skill in the art are also within the scope of this invention. Accordingly, the scope of the invention is intended to be defined by the claims that follow.

What is claimed is:

1. An automatic shut-off safety device which stops a fluid flow through at least a portion of a fluid delivery system when abnormal fluid flow occurs, said safety device comprising:
   a conduit including an influent port and an effluent port adapted to be installed within the fluid delivery system;
   a valve positioned between said influent and effluent port of said conduit and arranged to selectively block fluid flow through said conduit;
   a housing comprising a control chamber in which a movable partition is enclosed, said movable partition dividing said control chamber into at least first and second compartments separated by said movable partition, said first compartment being in fluid communication with said conduit through an inlet opening upstream of said valve and through an outlet opening downstream of said valve, said inlet opening having a larger effective cross-sectional flow area than that of said outlet opening;
   a first biasing member disposed inside said first compartment and coupled between said valve and said movable partition; and
   a second biasing member disposed inside said second compartment and coupled between said movable partition and said housing.

2. The safety device of claim 1, wherein the diameter of the outlet opening is substantially smaller than the diameter of the inlet opening.

3. The safety device of claim 2, wherein the outlet opening is a capillary.

4. The safety device of claim 1, additionally comprising a check valve cooperating with the inlet opening and positioned to allow fluid flow from said conduit into the first compartment, but prevents fluid flow in the opposite direction.

5. The safety device of claim 4, wherein said check valve comprises a biasing member arranged to bias a ball to sit against a valve seat to close the inlet opening, said biasing member position to apply a biasing force in a direction opposite the direction of flow into the first compartment through said inlet opening.

6. The safety device of claim 1, wherein said movable partition comprises a circular disk.

7. The safety device of claim 6, wherein said movable partition is a flexible diaphragm which is fixed about its peripheral edge to the housing.

8. The safety device of claim 1, wherein said second compartment is filled with a second fluid which is compressible.

9. The safety device of claim 8, wherein said housing has a vent for the second fluid to flow in and out of the second compartment.

10. The safety device of claim 1, wherein said second biasing member includes an adjustment mechanism positioned on the housing to be manipulable external of said housing to adjust the biasing force of said second biasing member.

11. The safety device of claim 1, wherein said first biasing member and second biasing member are springs.

12. The safety device of claim 1, wherein said valve is movable between an OPEN position and a CLOSE position, said valve blocking the flow of the first fluid through the conduit in the CLOSE position and generally unblocking the fluid flow through said conduit in the OPEN position.

13. The safety device of claim 12, additionally comprising a reset mechanism which retains the valve in the CLOSE position until the reset mechanism is activated.

14. The safety device of claim 13, wherein said valve is a gate valve.

15. The safety device of claim 14, wherein said reset mechanism includes a release pin, reset biasing member, and a detent member, said detent member cooperating with a first groove on the gate valve and being lodged therein with said gate valve in the CLOSE position, said reset biasing member applying a biasing force on said detent member in the direction of the gate valve, at least a portion of said release pin being external of said housing and coupled to said reset biasing member such that said reset mechanism is activated by moving said release pin to reduce the biasing force applied to said detent member by said biasing member.

16. The safety device of claim 15, wherein said gate valve includes a second groove which cooperates with the detent member of the reset mechanism with said gate valve in the OPEN position.

17. The safety device of claim 16, wherein a depth of said first groove is greater than the depth of said second groove.

18. The safety device of claim 16, wherein said first and second grooves are arranged on a surface of said gate valve such that a normal force applied against said gate valve surface by the detent mechanism lodged in said first groove is greater than a normal force applied against said gate valve surface by the detent mechanism lodged in said second groove.

19. The safety device of claim 12, wherein said valve is a gate valve.

20. The safety device of claim 1, wherein at least a portion of said housing is integrally formed with said conduit.

21. The safety device of claim 20, wherein said conduit includes a first end which is adapted to connect with an inflow pipe and a second end which is adapted to connect with an outflow pipe, said first and second ends of the conduit having threaded portions which detachably mates with threaded ends of the pipes.

22. The safety device of claim 21, additionally comprising a flow meter mounted on the conduit.

23. The safety device of claim 22, wherein said flow meter is integrally formed with the conduit and the housing.

24. A shut-off control device which stops a flow of fluid through said control device when a break or leak in the flow path occurs downstream of the device, said device comprising:

a valve movable between a CLOSE position to stop the flow of fluid through the device and an OPEN position to facilitate fluid flow through the device;

a housing defining a flow conduit through the housing, said housing at least partially supporting said valve;

a movable partition disposed inside said housing and defining a reservoir inside said housing;

an entry port formed within said housing to facilitate fluid flow between said reservoir and a flow path within said conduit upstream of said valve;

an exit port formed within said housing to facilitate fluid flow between said reservoir the flow path within said conduit downstream of said valve, said exit port being smaller in size than said entry port;

a bias member connecting said movable partition and said valve; and a reset mechanism which releasably holds said valve in the OPEN position until a break or leak occurs downstream of said control device and which releasably holds said valve in the CLOSE position until externally activated.

25. The shut-off control device of claim 24, wherein said valve is a gate valve.

26. The shut-off control device of claim 25, wherein said reset mechanism comprises a release member and a plunger mechanism including at least one detent, said plunger mechanism housed within the housing and positioned to engage a first slot on the gate valve with the gate valve in the CLOSE position, said release member being accessible outside said housing being coupled to said plunger mechanism such that manual manipulation of said release member disengages said detent from said first slot.

27. The shut-off control device of claim 26, wherein said detent gate valve includes a second slot that lies at a position on the gate valve to receive at least a portion of said detent with said gate valve is in the OPEN position.

28. The shut-off control device of claim 24, wherein said exit port is a capillary.

29. The shut-off control device of claim 28, wherein said movable partition is a flexible diaphragm.

30. The shut-off control device of claim 29, wherein said bias member is a spring which is substantially relaxed when the valve is at the CLOSE position.

31. A safety flow control device for a water pipe comprising:

a housing attached to said pipe and communicating with the water in said pipe to allow water inflow from the pipe upstream of said device and outflow to the pipe downstream of said device, the water flow within the housing having a fluid pressure due to accumulation of water in said housing;

a bias mechanism enclosed in said housing; and a valve at least partially enclosed by said housing, said valve being responsive to said fluid pressure in said housing and said bias mechanism, such that said valve is disposed outside of the water flow path in said housing to facilitate said flow during normal operations as the water and fluid pressure accumulate in said housing, and moves into said water flow path and cuts off said water flow path when abnormal fluid flow occurs downstream of said device.

32. An automatic safety device for stopping the flow of fluid therethrough when an abnormal fluid flow results in the flow path occurs downstream of said device, said device comprising:

a flexible partition which deforms and stores potential energy when it is deformed, and releases said potential energy when said deformation is removed;

a valve coupled to said flexible partition and movable between an OPEN position and a CLOSE position; and a housing having a wall structure which encloses said flexible partition and at least partially encloses said valve, said flexible partition partially fixed to said housing and dividing said housing into a first chamber and a second chamber, said wall structure having an inlet passage for fluid communication between said first chamber and the flow path upstream of said valve and an outlet passage for fluid communication between said first chamber and the flow path downstream of said valve, said inlet passage being greater in size than said outlet passage and having a check valve which permits fluid flow into said first chamber, but prevents fluid flow in the opposite direction.

33. The automatic safety device of claim 32, additionally comprising a reset mechanism which releasably retains the valve in the OPEN position until an abnormal fluid flow occurs, and which releasably retains the valve in the CLOSE position until externally activated.

34. The automatic safety device of claim 33, wherein said valve is a gate valve having a first groove and a second groove spaced apart from each other, said reset mechanism comprising a release pin, a reset spring, and a detent member, said detent member being lodged in said first groove with said gate valve in the CLOSE position and lodged in said second groove with said gate valve in the OPEN position, said release pin being connected to said reset spring such that said reset mechanism is activated by pulling said release pin to dislodge said detent member from said first groove.

35. A method for automatically stopping fluid flow in a flow path when the fluid pressure in the flow path drops abnormally due to a break or leak, said method comprising the steps of:

providing a valve capable of stopping the fluid flow in a flow path, said valve normally lying in an OPEN position such that it does not obstruct said flow path;

providing a biasing force to bias said valve to a CLOSE position in which said valve obstructs the fluid flow;

communicating mechanically the fluid pressure in said flow path to a pressure transducer to produce a pressure acting on said valve to oppose said biasing force so as to normally maintain said valve in said OPEN position;

reducing said pressure force until said biasing force overcomes said pressure force so as to move said valve to the CLOSE position upon an abnormal drop in pressure in said flow path; and releasably locking said valve in the CLOSE position, wherein said communicating mechanically the fluid pressure includes unimpeded communication between the pressure transducer and the fluid upstream of said valve and restricted communication said pressure transducer and the fluid downstream of the valve.

36. The method of claim 35, wherein said communication between the pressure transducer and the fluid upstream of said valve being terminated upon an abnormal drop in pressure in the flow path.

37. The method of claim 36, wherein said biasing force is provided by a deformable member which is relaxed when the valve is closed and deforms upon movement of said valve out of the CLOSE position.

38. A method of reinitializing a fluid flow in the flow path of claim 37 after the fluid pressure in the flow path has been restored to normal condition, said method comprising:

communicating mechanically the restored fluid pressure upstream of the valve in said flow path to said pressure transducer and producing a pressure force sufficient to overcome the biasing force; and unlocking said valve from said CLOSE position, thereby allowing said pressure force to move said valve into the OPEN position.

39. The method of claim 38, wherein said step of communicating mechanically the restored fluid pressure includes unimpeded communication between the pressure transducer and the fluid upstream of said valve and restricted communication between said pressure transducer and the fluid downstream of said valve.

* * * * *